United States Patent
Miller et al.

(10) Patent No.: US 8,866,593 B2
(45) Date of Patent: Oct. 21, 2014

(54) APPARATUS AND METHOD FOR INTEGRATING A TRANSMITTING DEVICE AND A BATTERY PACK

(75) Inventors: Robert Miller, Convent Station, NJ (US); Timothy Cunningham, Dedham, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 81 days.

(21) Appl. No.: 13/186,955

(22) Filed: Jul. 20, 2011

(65) Prior Publication Data

US 2011/0275314 A1      Nov. 10, 2011

Related U.S. Application Data

(63) Continuation-in-part of application No. 12/646,172, filed on Dec. 23, 2009, now Pat. No. 8,618,915.

(51) Int. Cl.
*H04Q 5/22* (2006.01)
*H04M 1/725* (2006.01)
*H04M 1/02* (2006.01)

(52) U.S. Cl.
CPC ........ *H04M 1/7253* (2013.01); *H04M 2250/04* (2013.01); *H04M 1/0262* (2013.01)
USPC ....................................................... 340/10.4

(58) Field of Classification Search
CPC ............... H04M 1/72519; H04M 1/72561; H04M 1/0262; H04M 1/0214; H04W 76/008
USPC ............ 340/10.4, 5.61, 7.54, 10.5; 429/7, 61; 455/41.1, 575.1
See application file for complete search history.

(56) References Cited

U.S. PATENT DOCUMENTS

| | | | |
|---|---|---|---|
| 6,380,845 B2 * | 4/2002 | Tuttle ........................... 340/10.4 |
| 6,611,673 B1 * | 8/2003 | Bayley et al. ................ 455/564 |
| 7,041,400 B2 * | 5/2006 | Kim et al. ......................... 429/7 |
| 7,541,779 B2 | 6/2009 | Takenaka | |
| 7,562,813 B2 * | 7/2009 | Humphrey et al. ........... 235/379 |
| 2004/0204170 A1 | 10/2004 | Mkhitarian | |
| 2005/0079820 A1 * | 4/2005 | Yamashita ................... 455/41.2 |
| 2006/0040171 A1 * | 2/2006 | Lee .................................. 429/61 |
| 2006/0173790 A1 | 8/2006 | Park et al. | |
| 2007/0135164 A1 * | 6/2007 | Lee ................................ 455/558 |
| 2010/0161257 A1 * | 6/2010 | Cornett et al. .................. 702/63 |

* cited by examiner

*Primary Examiner* — Vernal Brown
(74) *Attorney, Agent, or Firm* — Wolff & Samson, PC

(57) ABSTRACT

An apparatus includes a battery pack, processor attached to the battery pack, and an antenna attached to the processor for establishing a radio link with an electronic device powered by the batter pack.

15 Claims, 4 Drawing Sheets

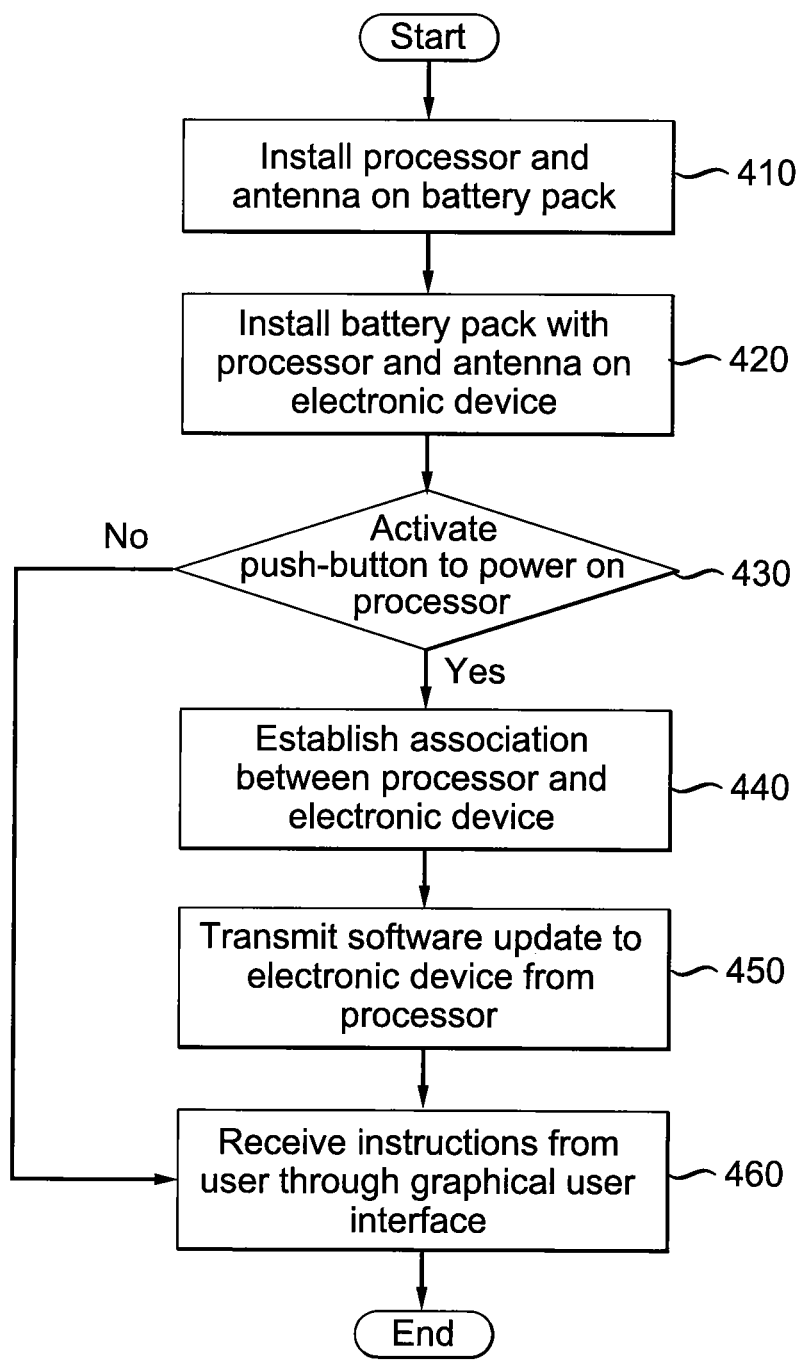

APPARATUS AND METHOD FOR INTEGRATING A TRANSMITTING DEVICE AND A BATTERY PACK

CROSS REFERENCE TO RELATED APPLICATIONS

This application is a continuation-in-part of U.S. patent application Ser. No. 12/646,172, filed Dec. 23, 2009, the entire disclosure of which is incorporated herein by reference.

FIELD OF THE INVENTION

The present application relates to battery packs for electronic devices, and in particular relates to integrating a transmitter or RFID apparatus with a battery pack of a personal electronic device.

BACKGROUND OF THE INVENTION

The use of Personal Area Networking (PAN) and radio frequency identification (RFID) wireless interfaces is prevalent within electronic devices. Cell phones may act as an RFID reader/client in a variety of applications including electronic transactions, inventory, or medical monitoring. These wireless interfaces allow cell phones to communicate with alternative hardware/software platforms other than mobile phone platforms.

Micro-SD cards, Mini-PCI, or other formats may be used to facilitate the PAN or RFID communication. However, building adjunct wireless-enabling circuits, such as those required for supporting Micro-SD cards, and Mini-PCI, into a cell phone or other electronic device may be too expensive and may reduce the phone user's ability to use a plug-in card such as Micro-SD cards or Mini-PCI for other applications.

SUMMARY OF THE INVENTION

An apparatus includes a battery pack, processor attached to the battery pack, and an antenna attached to the battery pack and processor for establishing a radio link with an electronic device powered by the batter pack and establishing a radio link with an external device. A push-button may be attached to the processor for activating the antenna. The processor may be powered by the battery pack.

In an embodiment, the processor is adapted to operate as a radio frequency identification tag. The antenna may further be adapted to communicate with the external device in a consumer transaction.

In an embodiment, the processor is adapted to receive instructions from a user input of the electronic device and send data via the antenna to the electronic device for display on the electronic device.

In an embodiment, the antenna transmits a software update from the processor to the electronic device. The software update includes a graphical user interface.

In an embodiment, a method communicating with an external device using a processor powered by a battery pack comprises establishing an association between the processor and an electronic device powered by the battery pack via communication between a first antenna attached to the processor and a second antenna attached to the electronic device, and transmitting data to the external device based on instructions received from the electronic device.

In an embodiment, a mobile communication system comprises an antenna, a first processor, a battery receptacle, and a battery pack attached to the battery receptacle to power the first processor. The battery pack comprises a second processor and a second antenna for establishing a radio link with the first processor via the first antenna and for establishing a radio link with an external device.

These and other advantages of the invention will be apparent to those of ordinary skill in the art by reference to the following detailed description and the accompanying drawings.

BRIEF DESCRIPTION OF THE DRAWINGS

FIG. 4 illustrates a method for communicating with an external device using a processor according to an exemplary embodiment.

DETAILED DESCRIPTION

Many PAN and RFID interfaces have been engineered to the point of becoming chip radios where the entire stack is contained in a single, low-cost, low-power integrated circuit.

The method and apparatus described herein supports the design of economical cellular phones or other electronic devices to either preserve an expensive SD-card slot for other user-added capabilities, or reduce cost by not requiring such slots to be implemented. Instead, the chip and antenna for a particular air interface (e.g. RFID) is integrated directly into the battery pack. Chip radios have been designed to fit into form factors such as credit cards, adding little height to the pack. Chip radios are inexpensive, and this capability adds little to the cost of the battery pack. The cost may be lower than a standardized full Micro-SD card implementation.

Since many interfaces that use PAN or RFID applications communicate infrequently at low power and with low transmission rates, use of battery power may not be an issue, as the cellular phone may pose a higher drain, even in standby. Moreover, the battery compartment of the phone is usually one of the least shielded areas in the phone's mechanical design, thereby improving antenna performance. The battery and cover may be situated close to the rear surface of the device, and therefore placing an antenna for RFID purposes may enable the antenna to be brought into close proximity to the surface of an external device such as an RFID reader instrument or RFID-equipped object. For passive RFID-equipped objects, this arrangement may improve the coupling to the passive device's antenna, which in other situations may be a challenged link.

The present apparatus and method utilizes a radio link to facilitate communication between a processor attached to the battery pack and an electronic device that is powered by the battery pack. Since the processor uses a radio link to communicate with an electronic device attached to the battery pack, no modifications are necessary to the electronic device. For example, no additional metallic connection points are needed on the electronic device to serve as a communication pathway from the electronic device to the processor since the processor will communicate with the electronic device wirelessly via the radio link. A user may initiate electronic transactions with external devices such as RFID readers and RFID-equipped objects through a graphical user interface displayed on the electronic device. The graphical user interface is provided to the electronic device by the processor.

The apparatus and method provide benefits related to hardware cost minimization in electronic devices, and improvement of range/reliability of RF communication to external devices such as RFID tags or readers.

Figure 1:
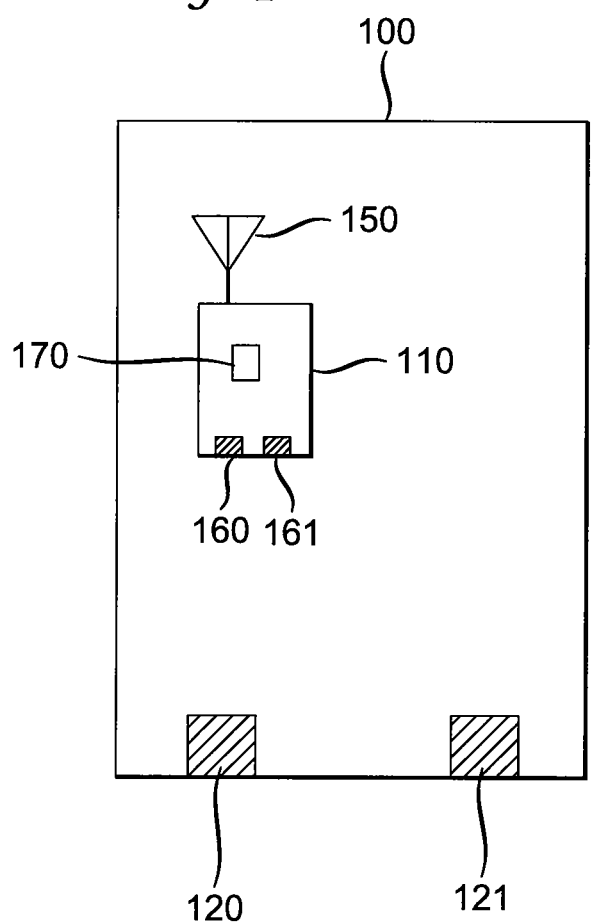
FIG. 1 illustrates a battery pack according to an exemplary embodiment.

FIG. 1 illustrates a battery pack according to an exemplary embodiment. Battery pack 100 may be used to power an electronic device. The electronic device may be, for example a mobile phone, pager, personal digital assistant, personal music player, or game machine. Battery pack 100 includes power contacts 120 and 121, for providing power to the electronic device. A processor 110 and antenna 150 may be installed on battery pack 100. Processor 110 may be integrated or installed onto battery pack 100 during production or as an after-market modification. Processor 110 may be an integrated chip or a chip stack (i.e., a multi-chip module of stacked dies of integrated circuits). In the case of processor 110 being an after-market modification of battery pack 100, processor 110 is designed to have a low profile in order to avoid interfering with the placement of battery pack 100 in a battery receptacle of the electronic device. In the case of processor 110 being integrated into battery pack 100 during production, processor 110 can be a low profile chip or chip stack, or alternatively fit into a recess in battery pack 100. In this manner, battery pack 100 including processor 110 is positioned to couple with a battery receptacle of an electronic device without additional modification of the electronic device.

Processor 110 is coupled to antenna 150, which is used to transmit and/or receive data from the electronic device as well as other external devices such as an RFID reader or RFID equipped device. An external device as described herein is a device other than an electronic device powered by battery pack 100. Processor 110 is coupled to battery pack 100 via power contacts 160 and 161. In this manner, processor 110 may draw power from battery pack 100 for the operation of processor 110 and for transmitting and receiving data using antenna 150. Alternatively, antenna 150 can receive transmissions, from an external device, having sufficient power to operate processor 110. In the event that processor 110 is adapted to draw power from battery pack 100 via power contacts 160 and 161, processor 110 is designed as a low power processor, which does not require significant power consumption.

Processor 110 and antenna 150 operate in a radio frequency band, and in particular operate as radio frequency identification (RFID) tag. When operating as an RFID tag, processor 110 and antenna 150 may be part of either a passive or an active RFID system, or alternatively may be part of another PAN air interface, for instance, ZigBee or Wi-Fi. In a passive RFID system, a battery is not required. Thus, when processor 110 communicates with an external device, the external device provides power to antenna 150, which in turn energizes processor 110 to initiate an electronic transaction. In an active RFID system, processor 110 will draw power from battery pack 100 to continuously transmit an RFID signal for communication with external devices.

In operating as an RFID tag or other short distance transmitting and receiving system, processor 110 engages in transactions for a user of the electronic device having battery pack 100. For instance, the electronic device having battery pack 100 may be used to purchase food or other items at a vending machine by selecting the item via a vending machine or via an interface of the electronic device, and purchasing the item via a debit of an account using processor 110 and antenna 150. The account used for such a transaction may be managed by an operator of a vending machine, either locally or at a central location, and managed by processor 110. Additionally, an account used to fund such a transaction may be a debit, credit or pre-paid account.

Usage is not limited to purely commercial transactions. For example, a user with an external device that is an RFID reader attached to a front door of a home may use electronic device 100 to unlock the front door via processor 110.

As discussed, processor 110 transmits and receives data from an electronic device powered by battery pack 100 via antenna 150. In this manner, processor 110 communicates with a user of the electronic device through a graphical user interlace provided by processor 110 in order to facilitate transactions. Specifically, processor 110 establishes an association with the electronic device after determining that the electronic device is capable of communicating with processor 110 via antenna 150. Once an association is established, processor 110 transmits a software update including a graphical user interface to the electronic device. Once the electronic device installs the software update, a graphical user interface may be accessed by a user of the electronic device to enable the user to initiate RFID transactions through processor 110.

Processor 110 may additionally be attached to a push-button 170. Upon activation of push-button 170, an instruction is transmitted to processor 110 to power on antenna 150 for a short period. This ensures that processor 110 is not always active and will only draw power from battery pack 100 when necessary to initiate or complete a transaction with an external device. Activation of push-button 170 initiates the establishment of an association between processor 110 and any electronic device powered by battery pack 100 if battery pack 100 is being installed for the first time in an electronic device. When an association has already been established between processor 110 and the electronic device, activation of push-button 170 facilitates communication between processor 110 and the electronic device for a short predetermined time in order to maximize usage of battery pack 100.

Figure 2:
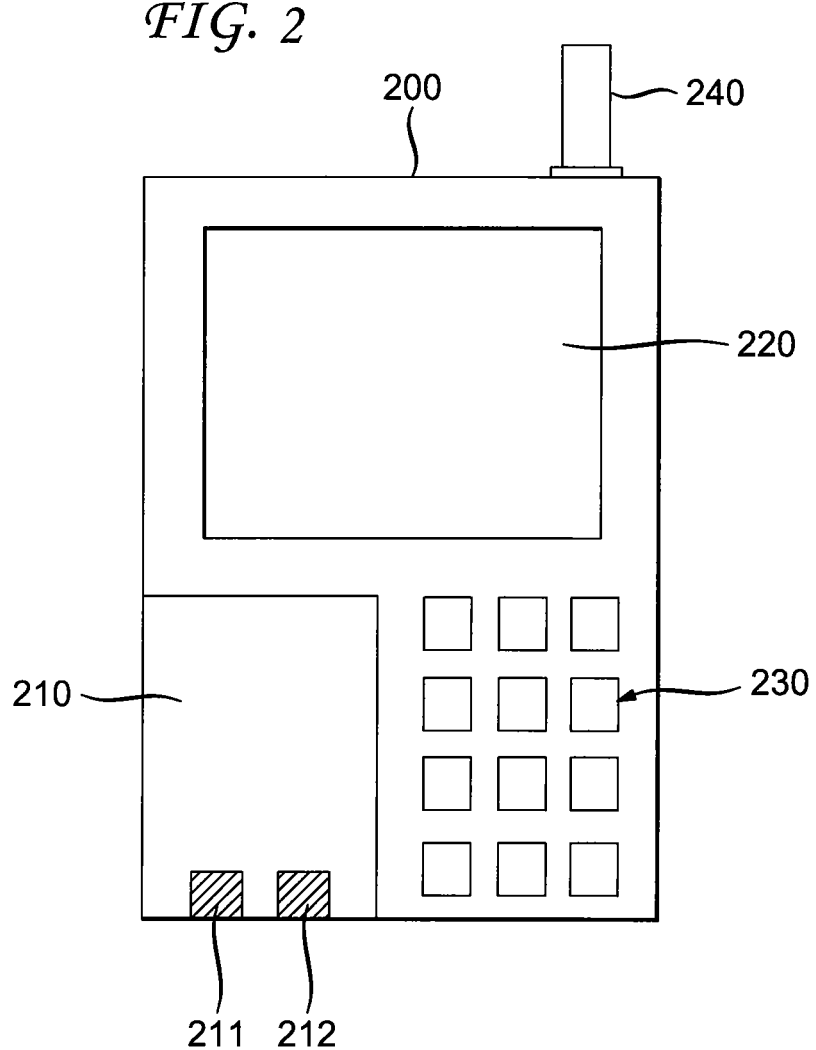
FIG. 2 illustrates a system for receiving a battery pack according to an exemplary embodiment.

FIG. 2 illustrates a system for receiving a battery pack according to an exemplary embodiment. Electronic device 200 may be a mobile telephone, pager, personal digital assistant, personal music player, or a game machine. Electronic device 200 includes battery receptacle 210 adapted to receive battery pack 100 shown in FIG. 1. Battery receptacle 210 includes power contacts 211 and 212 adapted to couple to power contacts 120 and 121 of battery pack 100. Electronic device 200 includes display 220, which displays information received from processor 110. Electronic device 200 processes the data received from processor 110 in another internal processor prior to displaying it on display 220. Electronic device 200 includes user interface 230 that may include buttons, and may include a processor, memory and a data storage system. Additionally, or alternatively, display 220 of electronic device 200 may include a touch screen interface and may therefore function as a user interface. Electronic device 200 includes antenna 240, which operates to connect electronic device 200 to a cell phone, Wi-Fi network, hot spot network, or any other appropriate network. Antenna 240 is also used to communicate with antenna 150 in order to receive data from and transmit data to processor 110.

Processor 110 sends data through antenna 150, which can be received by antenna 240 of electronic device 200. Electronic device 200 likewise sends data to processor 110 through antenna 240, the data being received by antenna 150 of processor 110. The data may be transmitted using various PAN interfaces including, but not limited to Wi-Fi, ZigBee, and Bluetooth. All transmissions of data sent and received by processor 110 described herein are via antenna 150 and all transmissions of data sent and received by electronic device 200 described herein are via antenna 240.

As a result, any battery pack 100 including processor 110 and antenna 150 may communicate with any electronic device 200 as long as electronic device 200 includes an antenna 240 that is capable of communicating using a PAN interface such as Wi-Fi, ZigBee, or Bluetooth.

User interface 230 is accessed in order to send instructions from electronic device 200 via antenna 240 to processor 110 for controlling processor 110 and/or the transmissions and receptions of antenna 150 relating to electronic transactions.

More specifically, processor 110 receives instructions from a user input through user interface 230, such as a request to purchase an item from a vending machine near electronic device 200. The instructions from user interface 230 are sent by electronic device 200 through antenna 240 to antenna 150 to processor 110. The instruction is then send via antenna 150 to an external device, in this case a vending machine. Once an item is purchase, the external device may send data including an indication of a purchase being made and a debit of an account to processor 110 via antenna 150. This information may then be sent to electronic device 200 via antenna 150 for display in user interface 230.

Figure 3:
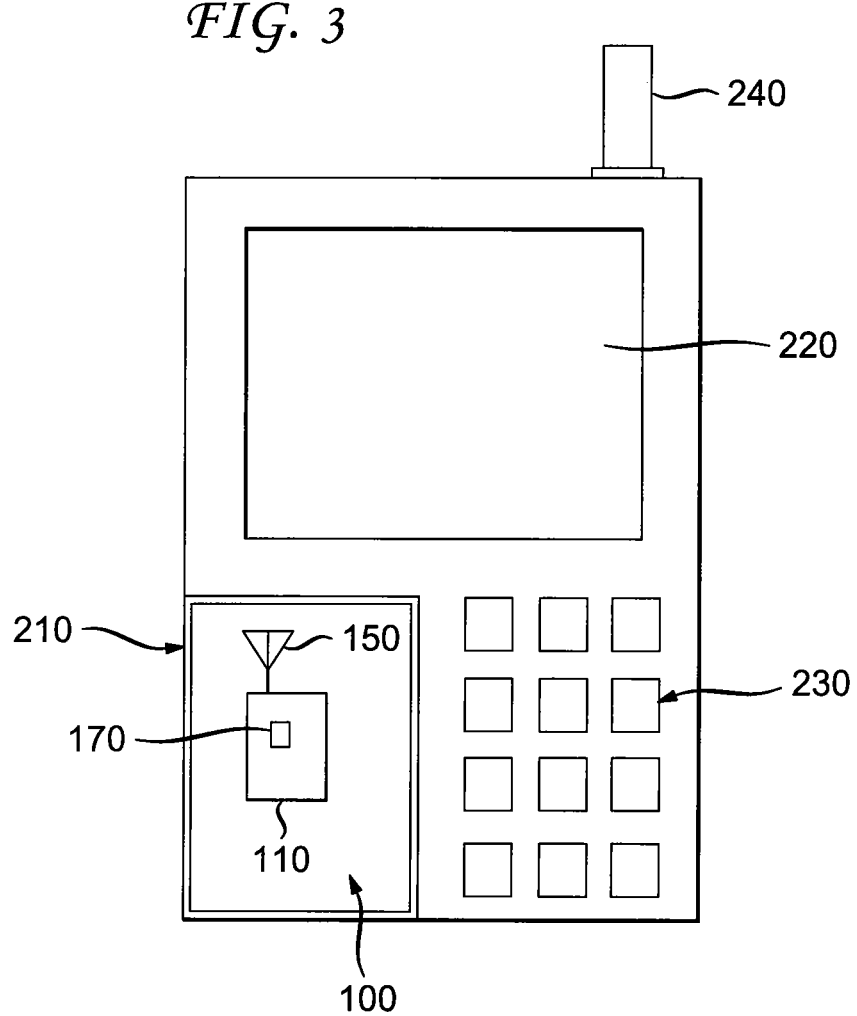
FIG. 3 illustrates a system and a battery pack according to an exemplary embodiment.

FIG. 3 illustrates a system including a battery pack according to an exemplary embodiment. FIG. 3 shows electronic device 200 illustrated in FIG. 2, including battery pack 100 inserted into battery receptacle 210.

FIG. 4 illustrates an exemplary method 400. At step 410, a processor 110 and antenna 150 are installed on a battery pack 100. For example, processor 110 and antenna 150 may be installed on battery pack 100 as described above. Processor 110 and antenna 150 may be an after market modification integrated chip that may be installed on battery pack 100 via power contacts 160 and 161 or alternatively may be installed within an enclosing of battery pack 100 forming a stand-alone unit.

At step 420, battery pack 100 with processor 110 and antenna 150 are installed in an electronic device 200. For example, battery pack 100 including attached processor 110 and antenna 150 is installed into battery receptacle 210 of electronic device 200.

At step 430, push-button 170 may be activated to activate the processor 110. Activation of push-button 170 causes processor 110 to draw power from battery pack 100 for a short predetermined period of time in order to establish communication between processor 110 and electronic device 200 via antenna 150. If an association between processor 110 and electronic device 200 has been previously established, the process proceeds to step 460.

The process proceeds to step 440 if battery pack 100 is newly installed in electronic device 200. In the event of a newly installed battery pack 100, at step 440, an association is established between processor 110 and electronic device 200.

At step 450, processor 110 transmits a software update including a graphical user interface to electronic device 200. The graphical user interface may then be used to initiate or complete transactions with external devices.

At step 460, processor 110 receives instructions from a user of electronic device 200 through the graphical user interface in order to communicate with external devices.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method of communicating with an external device, using a processor installed on a battery pack, comprising:
    establishing an association between the processor installed on the battery pack and an electronic device both powered by the battery pack via communication between a first antenna attached to the processor installed on the battery pack and a second antenna attached to the electronic device, wherein the establishing an association comprises activating a push button attached to the processor installed on the battery pack to establish a radio link between the processor installed on the battery pack and the electronic device; and
    transmitting data to the external device via the first antenna based on instructions received, via the second antenna, from the electronic device.

2. The method of claim 1, further comprising transmitting a software update including a graphical user interface to the electronic device for initiating transactions with the external device.

3. The method of claim 1, wherein transmitting data to an external device comprises: transmitting data related to a consumer transaction to the external device.

4. The method of claim 1, further comprising: transmitting data received from the external device, via the first antenna to the second antenna, to the electronic device for display on a screen of the electronic device.

5. The method of claim 1, wherein the processor operates as a radio frequency identification tag.

6. The method of claim 1, wherein the processor is powered by the battery pack.

7. The method of claim 1, further comprising:
    instructing the processor of the battery pack to power on the first antenna for a predetermined period of time.

8. The method of claim 7, wherein instructing the processor of the battery pack to power on the first antenna for a predetermined period of time comprises a first activation of the push button.

9. The method of claim 1, further comprising:
    facilitating communication between the processor of the battery pack and the electronic device for a predetermined period of time in response to a second activation of the push button and a determination that the association between the processor of the battery pack and the electronic device 10. A mobile communication system comprising:
    a first antenna;
    a first processor;
    a battery receptacle;
    a battery pack attached to the battery receptacle to power the first processor, the battery pack comprising:
        a second processor having a push button attached thereto; and
        a second antenna for transmitting data to an external device based on instructions received from the first processor via the first antenna.

11. The system of claim 10, wherein the push-button is to activate the second antenna.

12. The system of claim 10, wherein the second processor is to operate as a radio frequency identification tag.

13. The system of claim 10, wherein the second processor is to receive instructions transmitted to the second antenna via the first antenna from the first processor and send data, via the second antenna and the first antenna, to the first processor for display on the mobile communication system, the instructions representing a user input to the mobile communication system.

14. The system of claim 10, wherein the second antenna is to transmit, via the first antenna, a software update from the second processor to the first processor, the software update including a graphical user interface for initiating transactions with the external device.

15. The system of claim 10, wherein activation of the push-button facilitates communication between the first processor and the second processor for a predetermined period of time. is established.

\* \* \* \* \*